Aug. 21, 1945.  C. E. McGUIRE  2,383,139
AIRCRAFT
Filed Aug. 12, 1943

INVENTOR
C.E. McGuire

Patented Aug. 21, 1945

2,383,139

UNITED STATES PATENT OFFICE 2,383,139

AIRCRAFT

Cecil E. McGuire, Douglas, Ariz.

Application August 12, 1943, Serial No. 498,339

3 Claims. (Cl. 244—17)

This invention relates to an airplane of the helicopter type and embodies a mounting for the lifting screws which will permit them to be tilted about their centers of rotation to change their thrust angle and will also permit the pitch angle of the blades to be altered simultaneously to vary the direction and intensity of their thrust while they are in operation.

A further object is to provide a mounting for the screw blades which will permit the use of as many blades as is desired.

With the above and other objects in view the invention consists in certain novel details of construction and combination of parts hereinafter fully described and claimed, it being understood that various modifications may be resorted to within the scope of the appended claims without departing from the spirit or sacrificing any of the advantages of the invention.

In the accompanying drawing forming part of this specification,

Fig. 1 is a top plan view of a center portion of a lifting screw showing its universally mounted center ring, the pitch control levers and the inner ends of the screw blades. The design of the screw blades proper is covered in my Patent No. 1,910,622, the only alterations for this application is the blade hubs are mounted on a tubular ring instead of an axle and this ring is supported on a universal joint, and I have shown a three blade screw instead of a two blade one, however any number of blades can be mounted on this center ring; the pitch control levers are attached to a push-pull rod which works through a hollow axle instead of being attached to a sliding yoke on the outside of the axle and the thrust cable that passed through the hub and attached to the opposing blades is threaded around through the tubular ring and out through the hollow hubs of the individual blades.

Figure 1:
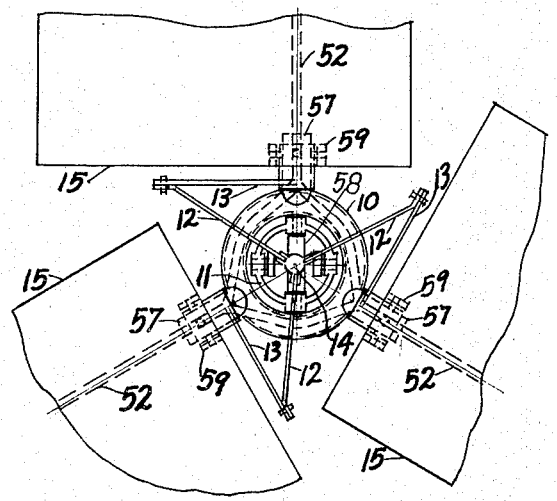
Figure 3:
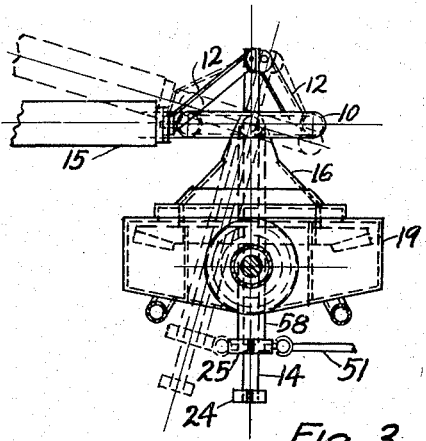
Fig. 3 is also a sectional elevation of the lifting screw taken at right angle to Fig. 2 and showing the screw tilted forward in dotted lines to produce a forward thrust.
Figure 2:
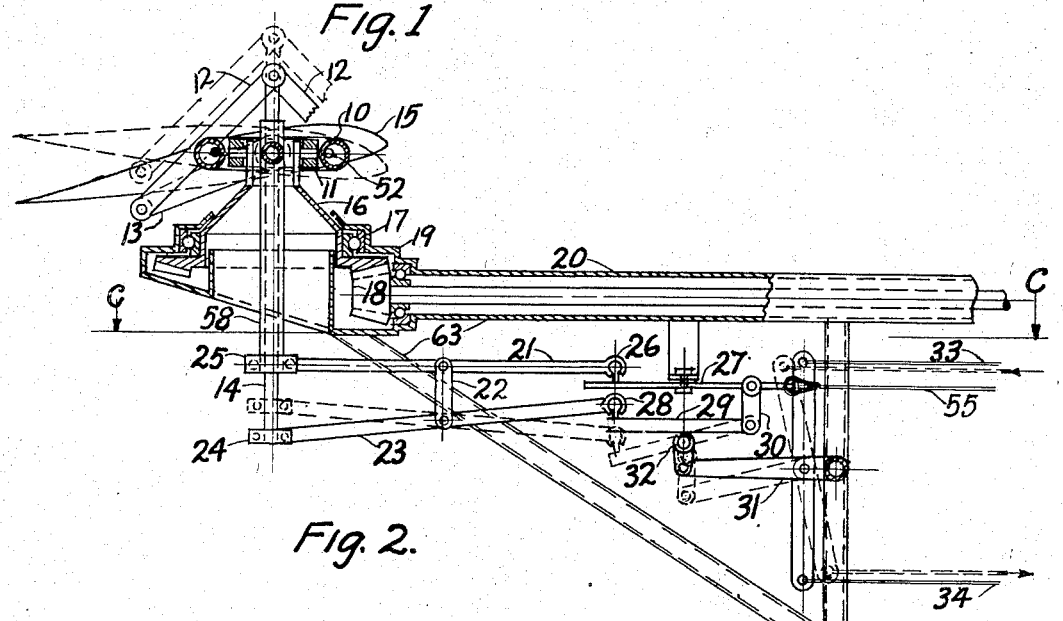
Fig. 2 is a sectional elevation of one of the opposing lifting screws showing its mounting and driving arrangement and showing the pitch control lever operation in dotted lines.
Figure 4:
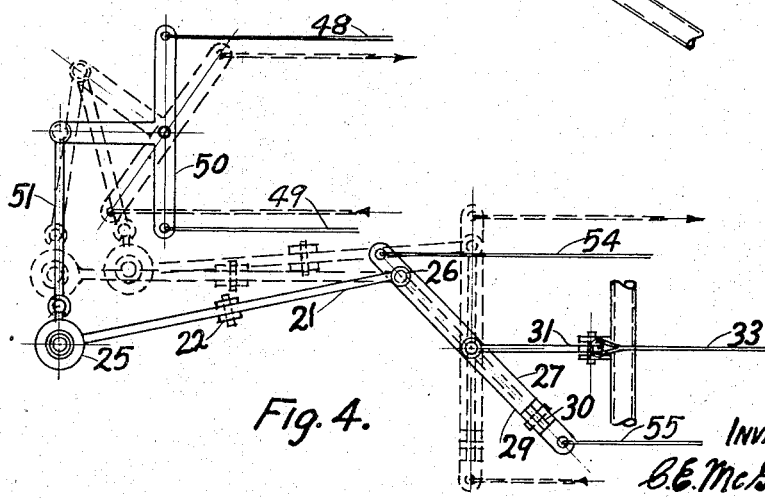
Fig. 4 is a sectional plan view of the bottom end of the axle and the control levers for positioning and holding the lower end of this axle, their operation is shown in dotted lines; this view is taken at C—C Fig. 2.

Referring now to the drawing in which like characters of reference designate similar parts in the various views, 10 designates the hollow center ring which supports the screw blades 15 through tubular hubs 57 which are integral with ring 10, this ring and hub assembly also provide a housing for thrust cables 52 which are threaded around through this ring and out at the hub openings to attach to the blades 15 to resist their centrifugal force, ring 10 is mounted on universal joint ring 11 which is in turn mounted on ring gear 16, ring 10 is mounted with its center at the center of the universal joint both vertically and horizontally so that it may be tilted about its own center of gravity to change the direction of its axis of rotation and there should be no resistance to this movement except bearing friction in the universal joint.

Ring gear 16 is mounted on bearing 17 which is supported in housing 19 which is in turn attached to one of the opposing ends of truss 63 which will be attached to the fuselage of the plane at its center, ring gear 16 is driven by pinion 18 and shaft 20 which in turn will be geared to the driving motor; thus it is shown that while the screw is being rotated by ring gear 16 it can be tilted in any direction by the operation of levers 27 and 50 which are connected to bearing 25 by connecting rods 21 and 51 respectively, bearing 25 is mounted on the lower end of hollow shaft 58 which is made integral with ring 10.

Push-pull rod 14 passes through hollow shaft 58, out at the top and connects to rods 12 which in turn connects to levers 13 which are made integral with rotating sleeves on hubs 57, these sleeves are connected to blades 15 through universal joint 59, this however is covered in my Patent No. 1,910,622, rod 14 is supported at its lower end by bearing 24 mounted on lever 23 which is fulcrumed to connecting rod 21 by link 22 and stays parallel with rod 21 while it is being moved by lever 27; lever 29 is hinged to lever 27 by link 30 and both levers rotate together, 26 and 28 are ball and socket joints; lever 27 is rotated by pulling cables 54 or 55, lever 29 is operated by lever 31 which is connected to 29 at its center of rotation by ball and socket joint 32 so that 29 can be raised or lowered by lever 31 while being rotated by lever 27.

Thus it is shown that the pitch of the screws may be altered at the same time the thrust angle is being altered and the operation of one control does not interfere with the operation of the other.

From the above description it is thought the construction and operation of the invention will be clearly understood without further explanation.

Having thus described the invention I claim:

1. In a helicopter, a rotating lifting screw, the axis of which is encircled by a tubular ring mounted on a universal joint, whose center is in the plane of rotation as well as the axis of rotation of said screw, tubular hubs attached to the outer perimeter of said ring, screw blades mounted on said hubs, a flexible steel cable threaded around through said tubular ring with ends extending through said tubular hubs and attached to said screw blades to resist their centrifugal force and to allow them to swivel on said tubular hubs to change the pitch angle of said blades and means for controlling their pitch angle.

2. In a helicopter, a rotating lifting screw, the axis of which is encircled by a tubular ring mounted on a universal joint and with tubular hubs attached to the outer perimeter of said ring, screw blades supported by said tubular hubs, flexible steel cable threaded around said tubular ring and attached to said screw blades to resist their centrifugal force, and means for rotating said ring through said universal joint.

3. In a helicopter rotor, a rotatable hub, universal joint means secured to said hub, symmetrically disposed blades mounted on and extending radially from said universal joint means, said blades being arranged to pivot about their longitudinal axis, a hollow, normally vertical axle connected to and extending through the center of said universal joint means, a longitudinally displaceable shaft extending through said axle, the extremities of said shaft extending beyond the ends of said axle, means interconnecting the top of said shaft and said blades, whereby relative motion of said shaft will cause said blades to pivot about their longitudinal axes for pitch variation, means for swinging said axle out of vertical position to effect tilting of the plane of rotation of said blades, and means for displacing said shaft upwardly and downwardly with relation to said axle.

CECIL E. McGUIRE.